(12) United States Patent
Takahashi

(10) Patent No.: US 7,980,279 B2
(45) Date of Patent: Jul. 19, 2011

(54) HEAVY DUTY TIRE

(75) Inventor: Shingo Takahashi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 995 days.

(21) Appl. No.: 11/892,761

(22) Filed: Aug. 27, 2007

(65) Prior Publication Data

US 2008/0047643 A1 Feb. 28, 2008

(30) Foreign Application Priority Data

Aug. 28, 2006 (JP) .................. 2006-230887

(51) Int. Cl.
*B60C 11/00* (2006.01)
*B60C 11/11* (2006.01)
*B60C 9/18* (2006.01)

(52) U.S. Cl. ............... 152/209.1; 152/209.18; 152/526; 152/902

(58) Field of Classification Search ............... 152/209.1, 152/209.18, 902, 526
See application file for complete search history.

(56) References Cited

U.S. PATENT DOCUMENTS

| | | | | |
|---|---|---|---|---|
| 5,234,326 A | * | 8/1993 | Galli et al. | 425/46 |
| 5,445,201 A | * | 8/1995 | Kukimoto et al. | 152/209.19 |
| 5,460,214 A | * | 10/1995 | Fujita et al. | 152/540 |
| 2004/0079460 A1 | * | 4/2004 | Maruoka et al. | 152/209.18 |
| 2005/0016656 A1 | * | 1/2005 | Kuroki et al. | 152/548 |
| 2005/0092412 A1 | * | 5/2005 | Iizuka | 152/209.18 |
| 2005/0216224 A1 | * | 9/2005 | Obunai | 702/145 |
| 2006/0048874 A1 | * | 3/2006 | Maruoka | 156/130 |

FOREIGN PATENT DOCUMENTS

| | | | |
|---|---|---|---|
| JP | 58-039438 | * | 3/1983 |
| JP | 11-300746 | * | 11/1999 |
| JP | 2004-51083 A | | 2/2004 |

OTHER PUBLICATIONS

Machine translation for Japan 11-300746 (no date).*

* cited by examiner

*Primary Examiner* — Steven D Maki

(74) *Attorney, Agent, or Firm* — Birch, Stewart, Kolasch & Birch, LLP

(57) ABSTRACT

A heavy duty tire is vulcanized in a segmented mold having a tread molding surface defined by circumferentially arranged segments. The tread portion is molded by the tread molding surface during vulcanization of the tire, wherein the stretch of the belt layer in the tire radial direction during vulcanization is in a range of from 3.2 to 5.2%. the tread portion is provided with an axially outermost circumferential groove at an axial distance from the tire equator which distance is in a range of from 50% to 68% of one half of the tread width. The footprint shape satisfies the following conditions: (1) $1.05 =< SL0/SL70 =< 1.18$; and (2) $0.95 =< SL70/SL97 =< 1.05$, wherein $SL0$, $SL70$ and $SL97$ are the circumferential lengths of the footprint shape measured at axial distances of 0%, 70% and 97%, respectively, of one half of the tread width from the tire equator.

5 Claims, 7 Drawing Sheets

HEAVY DUTY TIRE

BACKGROUND OF THE INVENTION

The present invention relates to a pneumatic tire provided in a tread shoulder portion with a circumferential groove, more particularly to a heavy duty tire improved in uneven wear in the vicinity of the circumferential groove.

In the case of heavy duty tires such as truck/bus tires having a rib-type or block-type tread pattern comprising a circumferentially extending wide groove in each tread shoulder portion, as well known in the art, so called shoulder wear, railway wear and punching, namely, uneven tread wear in the vicinity of the axially outermost circumferential groove are very liable to occur.

Heretofore, a main cause of such uneven tread wear is believed to be an uneven ground pressure distribution due to the difference in the outer diameter of the tire existing between the tread central region and shoulder region, and/or a sufficient rigidity of tread elements such as rib and block existing in the vicinity of the axially outermost circumferential groove.

However, as a result of extensive studies, the present inventor found that the radial run-out (RRO) of a tread reinforcing belt layer is largely involved in such uneven wear, and that the uneven wear can be improved if the radial run-out of the belt layer is decreased.

Usually, pneumatic tires inclusive of heavy duty tires are vulcanized in a segmented mold M, whose surface U for molding the tread portion of the tire is, as shown in FIG. 6, made up of a plurality of circumferentially arranged segments Sg. The inventor found that the tread reinforcing belt layers of the tires vulcanized in such segmented mold M tend to have a radial run-out increased at a particular order which is the same as the number (n) of the sprit positions (j) of the segments Sg counted around the circumference of the tire, and realized that the radial run-out of the tread reinforcing belt can be reduced by reducing the n-th order component thereof (of course, other components should be small enough at the same time). It is supposed that at the circumferential positions where the radial run-out of the belt layer is larger, the ground pressure becomes higher, and as a result, local initial wear starts and such wear develops into the above-mentioned uneven tread wear concerned. However, if the RRO of the belt layer is reduced, local initial wear is inhibited and accordingly, the uneven tread wear can be improved.

SUMMARY OF THE INVENTION

It is therefore, an object of the present invention to provide a heavy duty tire vulcanized in a segmented mold, in which uneven tread wear such as shoulder wear, railway wear and punching can be improved by reducing the radial run-out of the belt layer while optimizing the footprint shape, the position of the axially outermost circumferential groove.

According to the present invention, a heavy duty tire vulcanized in a segmented mold comprises: a tread portion defining a tread width and a footprint shape; a pair of sidewall portions; a pair of bead portions; a carcass extending between the bead portions through the tread portion and sidewall portions; and a belt layer disposed radially outside the carcass in the tread portion and composed of at least two plies of steel cords, wherein the segmented mold has a tread molding surface defined by a plural number (n) of circumferentially arranged segments, the tread portion is molded by the tread molding surface during vulcanization of the tire, wherein the stretch of the belt layer in the tire radial direction during vulcanization is in a range of from 3.2 to 5.2%, the tread portion is provided with an axially outermost circumferential groove at an axial distance from the tire equator which distance is in a range of from 50% to 68% of one half of the tread width, the footprint shape satisfies the following conditions (1) and (2):

$$1.05 = < SL0/SL70 = < 1.18; \text{ and} \quad (1)$$

$$0.95 = < SL70/SL97 = < 1.05, \quad (2)$$

wherein
$SL0$, $SL70$ and $SL97$ are the circumferential lengths of the footprint shape measured at axial distances of 0%, 70% and 97%, respectively, of one half of the tread width from the tire equator.

DESCRIPTION OF THE PREFERRED EMBODIMENT(S)

Figure 1:
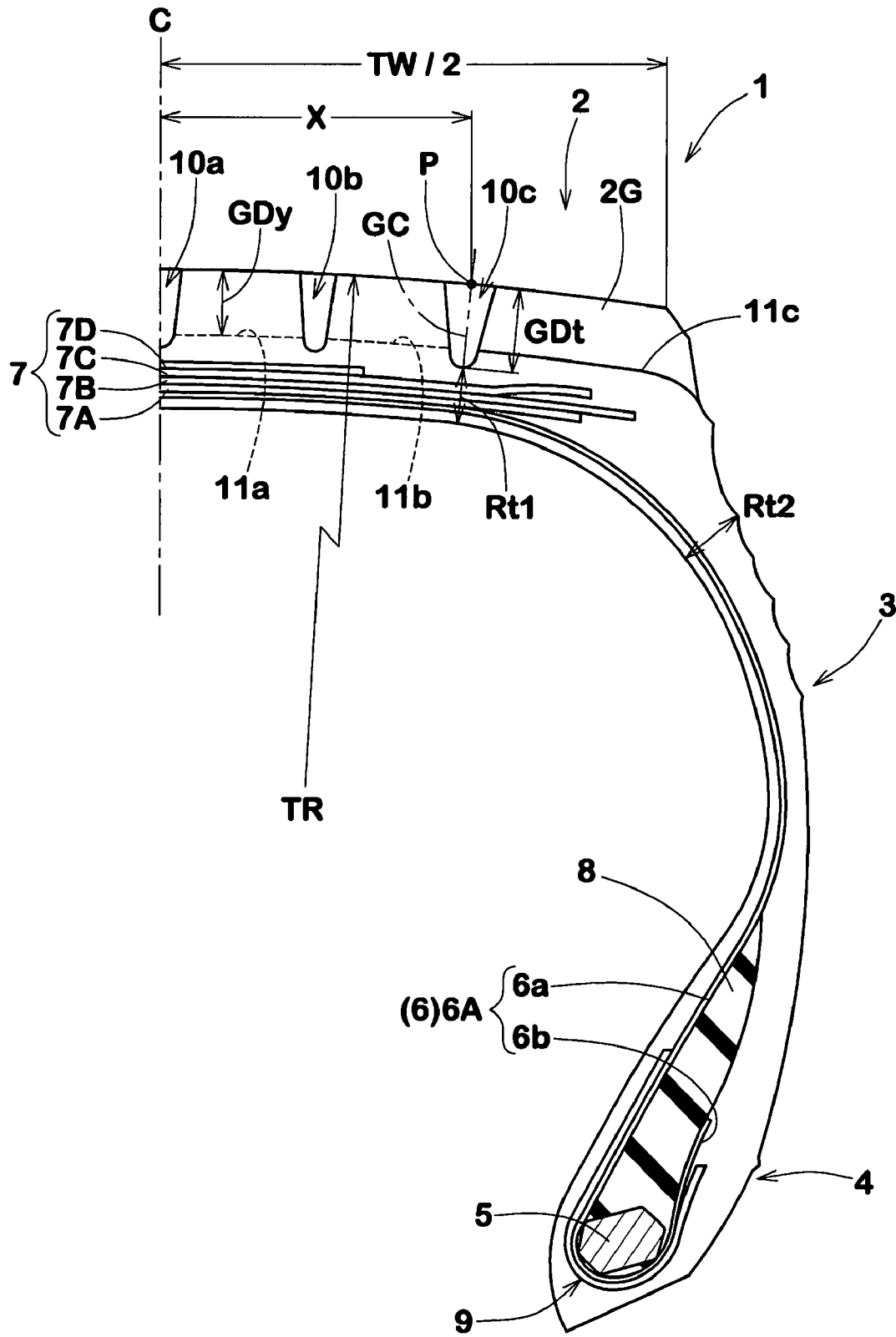
FIG. 1 is a cross sectional view of a heavy duty tire according to the present invention.

An embodiment of the present invention will now be described in detail in conjunction with the accompanying drawings.

In the drawings, heavy duty tire 1 according to the present invention comprises: a tread portion 2; a pair of sidewall portions 3; a pair of bead portions 4 each with a bead core 5 therein; a toroidal carcass 6 extending between the bead portions 4 through the tread portion 2 and sidewall portions 3; and a belt layer 7 disposed radially outside the carcass 6 in the tread portion 2.

The carcass 6 is composed of at least one ply 6A of steel cords arranged radially at an angle in a range of from 70 to 90 degrees with respect to the tire equator C, extending between the bead portions 4 through the tread portion 2 and sidewall portions 3 and turned up around the bead core 5 in each bead portion 4 from the axially inside to the axially outside of the tire to form a pair of turnup portions 6b and a main portion 6a therebetween. In this example, the carcass 6 is composed of a single ply 6A of steel cords arranged radially at substantially 90 degrees.

Between the main portion 6a and each turned-up portion 6b of the carcass ply 6A, there is disposed a bead apex 8 made of a hard rubber extending radially outwardly from the bead core 5 to enhance the bending rigidity of the bead portion 4 and sidewall lower portion optionally, the bead portion 4 can be provided with a reinforcing cord layer 9, for example, extending around the bead core 5 in an approximately u-shaped cross sectional shape as shown in FIG. 1.

The belt layer 7 is composed of at least two, preferably at least three plies of steel cords, including two cross breaker plies. In this embodiment, the belt layer 7 is composed of four plies: a radially innermost first ply 7A of parallel steel cords laid at an angle of 45 to 75 degrees with respect to the tire equator C; and second, third and fourth plies 7B, 7C and 7D each made of parallel steel cords laid at a small angle of 10 to 35 degrees with respect to the tire equator C.

In the tread portion 2, a tread rubber 2G is disposed radially outside the belt layer 7 to define the tread surface having a tread profile under the normally inflated unloaded condition, the tread profile is a convex curve which in this embodiment has a single radius TR, but the tread profile may be a multi-radius curvature or a variable radius curvature Here, the normally inflated unloaded condition is such that the tire is mounted on a standard wheel rim and inflate to a standard pressure but loaded with no tire load. Further, the normally inflated loaded condition is such that the tire is mounted on the standard wheel rim and inflate to the standard pressure and loaded with the standard tire load. The standard wheel rim is a wheel rim officially approved for the tire by standard organization, i.e. JATMA (Japan and Asia), T&RA (North America), ETRTO (Europe), STRO (Scandinavia) and the like. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load Capacity" in ETRTO, the maximum value given in the above-mentioned table in TRA or the like.

The tread edges E are the axial outermost edges of the ground contacting patch (camber angle=0) in the normally inflated loaded condition. The tread width TW is the axial distance between the tread edges E measured in the normally inflated unloaded condition.

The tread portion 2 is provided between the tread edges E with tread grooves defining a tread pattern.

The tread grooves include circumferential grooves 10 extending continuously in the tire circumferential direction and optionally axial grooves 11.

In this embodiment, the circumferential grooves 10 are five grooves: one central circumferential groove 10a near or on the tire equator C; a pair of middle circumferential grooves 10b disposed one on each side of the groove 10a; and a pair of axially outermost circumferential grooves 10c.

The circumferential grooves 10 may be provided with various configurations, e.g. zigzag configurations, wavy configurations, a straight configuration and the like, alone or in combination. In this example, however, in order to improve road grip performance such as traction and braking performance, all the circumferential grooves 10 have zigzag configurations of the same zigzag pitches. But, the middle circumferential groove 10b has a gentle zigzag configuration to enhance the drainage in the tire circumferential direction. The central circumferential groove 10a has a steep zigzag configuration so as to accumulate a larger volume of water. The axially outermost circumferential groove 10c has a middle zigzag configuration to achieve such accumulation and the drainage in the circumferential direction at the same time in a well balanced manner.

An excessively small width or depth may deteriorate drainage performance, while an excessively large width or depth may deteriorate the tread pattern rigidity and noise performance. In view of this, the widths GW1, GW2 and GW3 of the circumferential grooves 10a, 10b and 10c, respectively, are preferably not less than 1.5%, more preferably not less than 1.8%, but preferably not more than 5.5%, more preferably not more than 5.0% of the tread width TW, The depths GDt of the circumferential grooves are preferably not less than 6.0%, more preferably not less than 6.5%, but preferably not more than 9.0%, more preferably not more than 8.5% of the tread width TW.

The present inventor has conducted experiments and found that uneven wear can be reduced by satisfying the following conditions (A), (B) and (c).

(A) The axial distance X of the axially outermost circumferential groove 10c from the tire equator C is in a range of from 50 to 68% of one half (TW/2) of the tread width TW, wherein the axial distance X is measured from the tire equator C to the groove center line Gc in the case that the groove has a straight configuration, but in the case that the groove has a non-straight configuration as in the present embodiment, the axial distance X is measured from the tire equator C to the center of the amplitude of the groove center line Gc.

Figure 3:
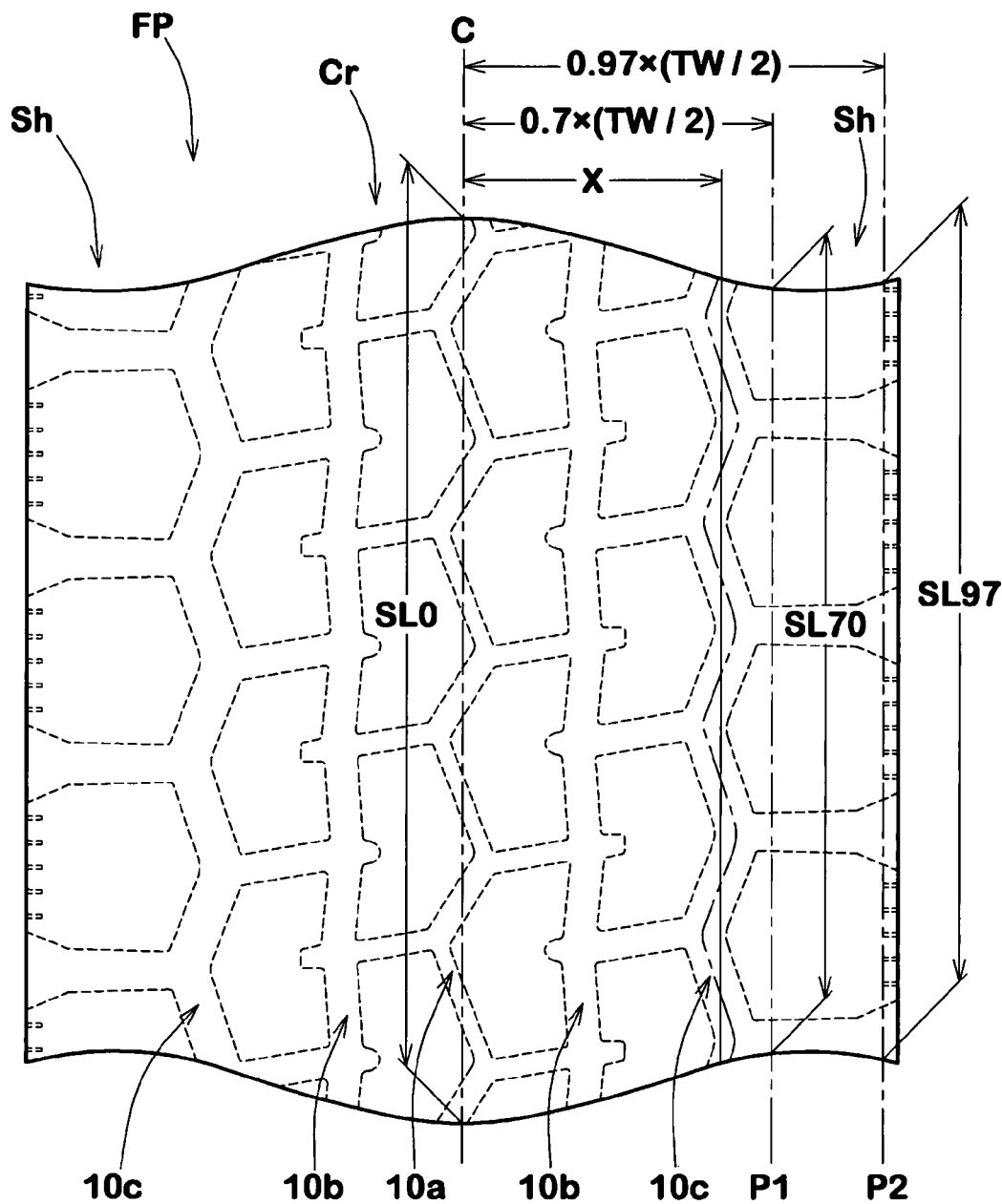
FIG. 3 is a diagram showing a footprint shape of the heavy duty tire.

(B) The foot print shape FP of the tire under the normally inflated loaded condition satisfies:

$$1.05 =< SL0/SL70 =< 1.18; \text{ and} \tag{1}$$

$$0.95 =< SL70/SL97 =< 1.05, \tag{2}$$

wherein SL0, SL70 and SL97 are, as shown in FIG. 3, the circumferential lengths measured at axial distances of 0%, 70% and 97%, respectively, of one half (TW/2) of the tread width TW from the tire equator C. From a practical standpoint, the foot print may be varied more or less as the tire rotate because the tread grooves within the foot print vary their positions especially circumferential positions relative to the foot print. In such a case, the exact foot print shape can be obtained as a shape which shows the maximum extent of the foot prints. More specifically, rotating the tire, a large number of foot prints are obtained at regular intervals around the tire circumference, and the obtained foot prints are overlapped to find the maximum extent of the foot prints and an envelope is draw along such maximum extent. The shape of this envelope can be used as the exact foot print shape FP.

(C) During the tire is vulcanized in a segmented mold M, the stretch s of the belt layer 7 in the radial direction is limited in a range of from 3.2% to 5.2%. The stretch s (%) is:

$$S=(Ra-Rb)/Rb \times 100$$

wherein Rb is the inner diameter (mm) of the belt layer embedded in a green tire of which inside is not yet pressurized, and Ra is the inner diameter (mm) of the belt layer embedded in the vulcanized tire which is mounted on the standard rim and inflated to 0.5 kPa and loaded with no tire load. Both diameters Ra and Rb are measured at the tire equatorial plane.

If the stretch s is excessively large, the vulcanized finished tire 1 is liable to alter its dimensions from the expected. Therefore, the stretch s is preferably not more than 5.0%.

Figure 7:
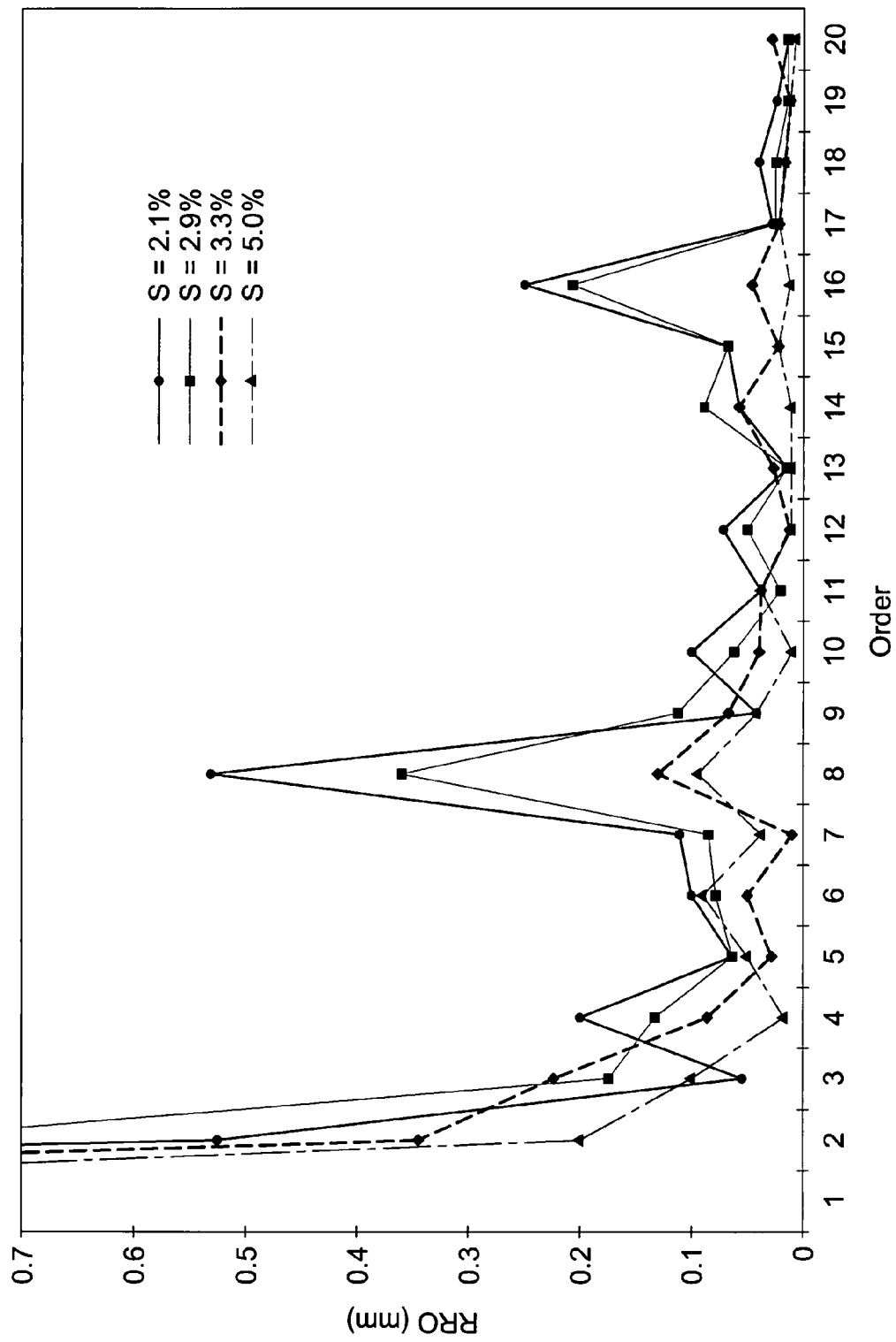
FIG. 7 is a graph showing examples of the radial run-out of the belt layers.

FIG. 7 shows a relationship between the stretch S and radial run-out (RRO) of the belt layer, wherein the number of the segments of the mold was eight. The tire size was 12R 22.5. This graph shows that, when the stretch is 2.1% and 2.9%, the 8th order component of the RRO becomes significantly large, but when the stretch is 3.3% and 5.0% (and also 4.0% and 4.5% although not plotted), the peak of the 8th order component is moderated.

The RRO of the belt layer, as used herein, refers to the maximum amplitude in mm of the radial run-out of the belt layer 7 of the tire under the normally inflated unloaded condition as measured at an axial distance of 70% of one half (TW/2) of the tread width (TW) from the tire equator C. Incidentally, the amplitude of the radial run-out of the belt layer embedded in the tread rubber can be measured as a distance to the steel cords of the belt layer, by the use of a sensor for ultrasound, magnetism, eddy current or the like, while rotating the tire, for example as disclosed in Japanese Patent Application Publication No. 2004-101433.

The n-th order component can be obtained by Fourier transformation of the waveform of the RRO corresponding to one revolution of the tire.

Thus, despite the tire vulcanized in the segmented mold M, the RRO of the belt layer can be reduced specifically, the component of the RRO which is the same order as the number of the segments Sg can be reduced to about 0.20-0.15 mm or less. The decreased RRO leads to inhibition of local initial wear, which would otherwise serve as the starting point of the uneven wear concerned. Accordingly, the uneven wear can be improved.

If the above-mentioned axial distance X is less than 50% of TW/2, then uneven wear becomes liable to occur in the crown region cr (in this example, on the blocks 12a, 12b) between the axially outermost circumferential grooves 10c rather than the shoulder region Sh (shoulder blocks 12c) axially outside the axially outermost circumferential groove 10c. If the axial distance X is more than 68% of TW/2, then the shoulder region Sh is very liable to wear, namely, the shoulder wear is very liable to occur. Further, there is a tendency toward chipping-off of the tread elements.

If the ratio SL0/SL70 in the above-mentioned condition (1) is more than 1.18, then there is a tendency toward tread crown wear. If the ratio SL0/SL70 is less than 1.05, there is a tendency toward degradation of the steering wheel operation. In view of this, the ratio SL0/SL70 is preferably not less than 1.06, more preferably not less than 1.08, but preferably not more than 1.17, more preferably not more than 1.15.

If the ratio SL70/SL97 is less than 0.95, then there is a tendency toward railway wear. If the ratio SL70/SL97 is more than 1.05, then there is a tendency toward shoulder wear. In view of this, the ratio SL70/SL97 is preferably not less than 0.96, more preferably not less than 0.98, but preferably not more than 1.04, more preferably not more than 1.03.

Therefore, the circumferential length of the foot print shape FP is substantially constant between an axial positions P1 at the axial distance of 70% of one half (TW/2) of the tread width (TW) from the tire equator C, and an axial positions P2 at the axial distance of 97% of one half (TW/2) of the tread width TW from the tire equator C.

In contrast, the circumferential length of the foot print shape FP decreases from the tire equator C to the axial positions P1. In this embodiment, the length is gradually decreased, and between the positions P1 and P1, the circumferential edges of the foot print shape FP are each convexly, smoothly curved.

Incidentally, the above-mentioned foot print shape FP can be achieved by changing the profile of the radially outer surface of the belt layer 7, the profile of the tread surface, and/or the thickness of the tread rubber 2G.

Figure 4A:
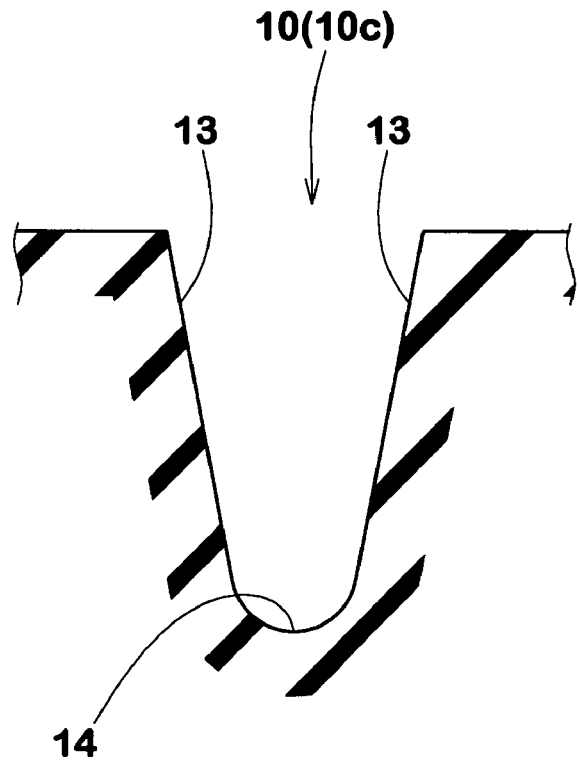
FIGS. 4(a) and 4(b) are cross sectional views for explaining the axially outermost circumferential groove.
Figure 4B:
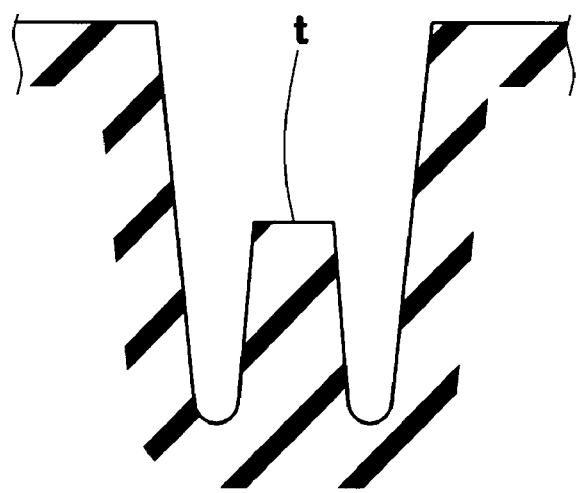

If the axially outermost circumferential groove 10c is partially provided with protrusions (t) as shown in FIG. 4(b), there is a possibility of degrading the RRO. Therefore, if possible, it is better not to form such protrusions on the groove walls 13 and bottom 14 partially along the length of the groove as shown in FIG. 4(a). Also it is desirable that axial sips extending to and opened at the axially outermost circumferential groove 10c are not provided on each side of the groove 10c although the provision of circumferential sips extending to the axial grooves 12 is possible.

Figure 2:
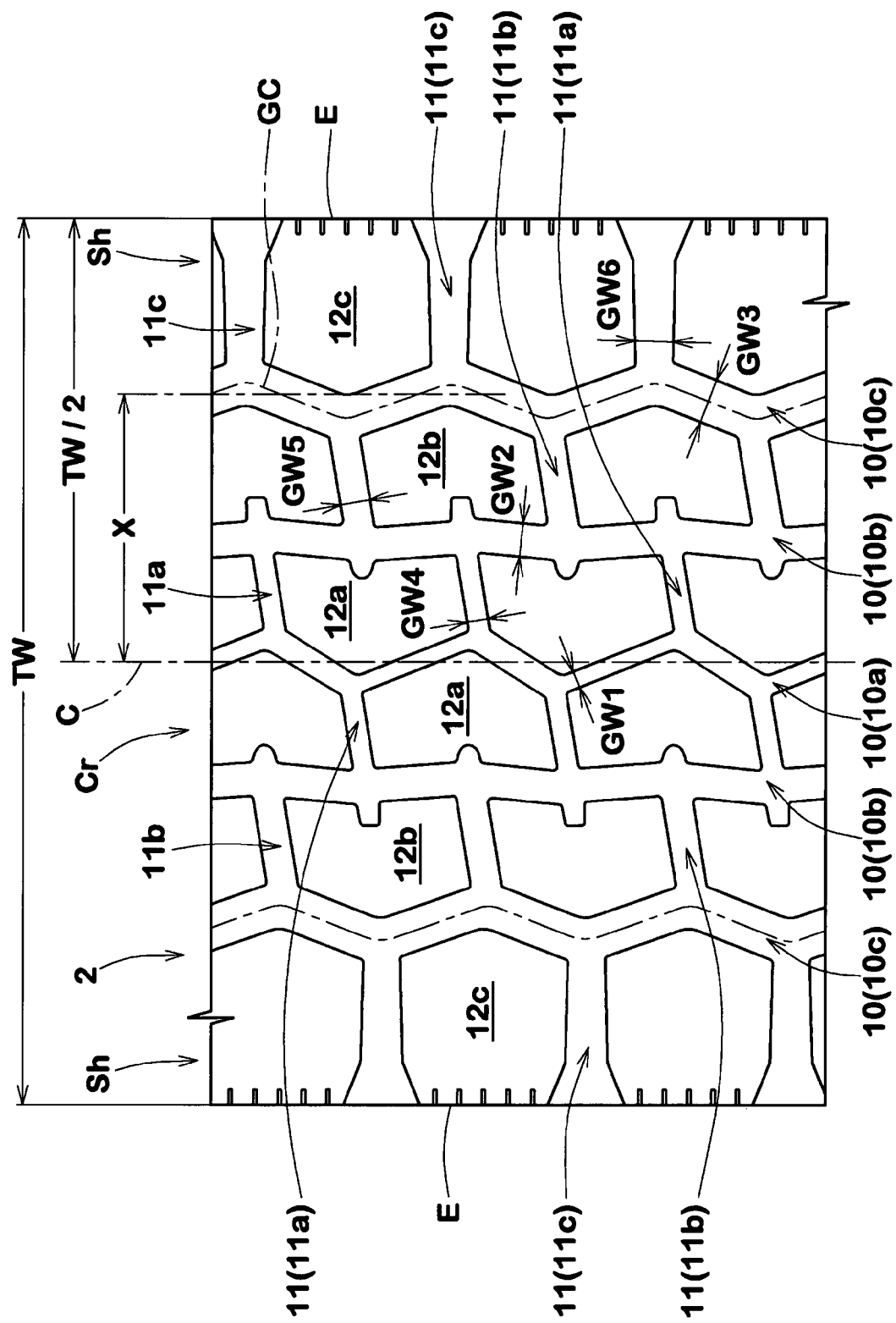
FIG. 2 is a developed partial view of the tread portion showing an example of the tread pattern.

In this embodiment, as shown in FIG. 2, axial grooves 11 are also provided in the tread portion 2. The axial grooves 11 include: central axial grooves 11a between the circumferential grooves 10a and 10b; middle axial grooves 11b between the circumferential groove 10b and 10c; and outer axial grooves 11c between the axially outermost circumferential grooves 10c and the tread edges.

The axial grooves 11a and 11b between the zigzag circumferential grooves 10a, 10b and 10c are extended along straight lines drawn between zigzag peaks of the axially adjacent circumferential grooves 10a, 10b and 10c. In order to improve the tread pattern noise and wet performance, the central and middle axial grooves 11a and 11b are inclined to the same direction (in FIG. 1, left-side upward inclination) at an angle of less than 45 degrees, preferably less than 30 degrees with respect to the tire axial direction. However, the outer axial grooves 11c are not inclined in order to increase the rigidity and the wear resistance of the shoulder blocks 5c. The outer axial grooves 11c are substantially parallel with the tire axial direction, namely, the angle of each outer axial groove 11c is 0 to 5 degrees with respect to the tire axial direction.

Therefore, the tread portion 2 is divided into: a circumferential row of crown blocks 12a between the central circumferential grooves 10a and each of the middle circumferential grooves 10b; a circumferential row of middle blocks 12b between each of the middle circumferential grooves 10b and the adjacent axially outermost circumferential groove 10c; and a circumferential row of shoulder blocks 12c between each of the axially outermost circumferential grooves 10c and the adjacent tread edge E. The zigzag configurations of the circumferential grooves 10a and 10c provide each of the blocks 12a-12c with a v-shaped edge.

The widths GW4, GW5, or GW6 of the central axial grooves 11a, the middle axial grooves 11b, and the outer axial grooves 11c, respectively, are preferably not less than 1.8% more preferably not less than 2.0%, but not more than 6.0%, more preferably not more than 5.5% of the tread width TW. The depths GDy of the axial grooves are preferably not less than 3.0%, more preferably not less than 3.5%, but, not more than 9.0%, more preferably not more than 8.5% of the tread width TW.

In a method for manufacturing the heavy duty tire 1 according to the present invention, the belt layer 7 is formed by applying rubberized belt cord strips (corresponding to the plies 7A-7C) onto a profiled belt drum, and a tread rubber strip is further applied onto belt layer 7 wound around the belt drum, whereby an assembly of the tread rubber 2G and belt layer is formed. At the same time, using an expandable tire building drum, a tire main body is formed. In the contracted state of the drum, an inner liner rubber, the carcass 6 and the like are wound on the drum the annular bead cores 5 are set therearound, and the carcass edges are wound around the bead cores. The above-mentioned assembly is placed around the carcass. The carcass is swollen, reducing the distance between the bead cores, so that the carcass crown portion closely contacts with the radially inner surface of the belt layer other tire components, e.g. sidewall rubber, bead rubber, bead apex rubber, bead reinforcing layer, and the like are timely applied, and a green tire or unvulcanized tire is formed.

Thus, the above-mentioned inner diameter Rb is substantially the same as the diameter of the belt drum at the corresponding position.

Figure 5:
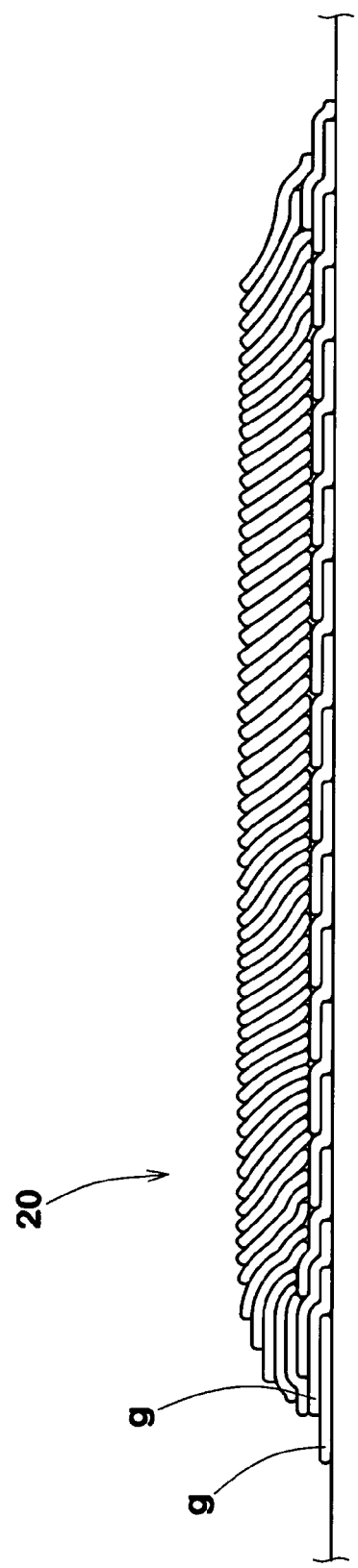
FIG. 5 is a cross sectional view of a raw tread rubber formed by winding a rubber tape a large number of turns.
Figure 6:
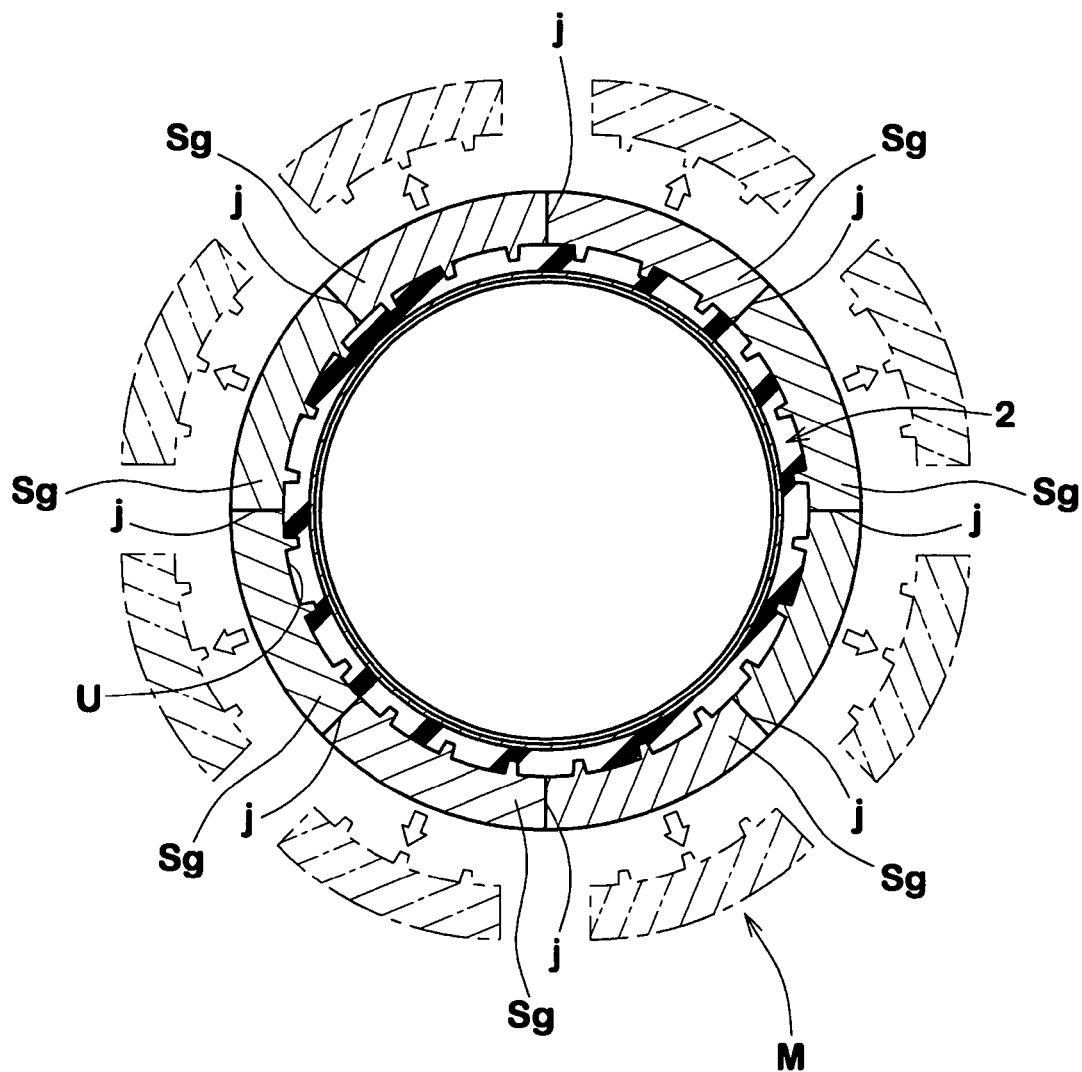
FIG. 6 is a schematic cross sectional view for explaining a segmented mold taken along the tire equator.

The raw tread rubber 2G disposed on the radially outside of the belt layer can be a conventional full-width strip of rubber compound whose circumferential ends are spliced. In this embodiment, however, as shown in FIG. 5, used is a raw tread rubber 2G which is formed by overlap winding a raw rubber tape (g), namely, the tread rubber 2G is made up of a large number of windings 20 of the rubber tape since there is no splice joint, the RRO of the tire as a whole can be further improved in cooperation with the reduced RRO of the belt layer.

The above-mentioned segmented mold M is opened by moving the segments Sg radially outwardly. Then, the green tire is put in the mold M, and an inflatable bladder is set in the tire hollow. The mold is closed. The temperature of the mold is increased to heat the tire. At the same time, the bladder is inflated with a high-pressure, high temperature medium to pressurize the inside of the tire so that the tire is vulcanized. Due to the pressure applied to the inside of the belt layer, the belt layer is stretched, and then as the tire is vulcanized and cooled, the stretch is fixed to show the above-mentioned inner diameter Ra.

Incidentally, whether the tire has been vulcanized in such segmented mold or not is recognizable because indicium such as thin line or small projection such as burrs are formed on the molded surface. It is also recognizable form the cut surface whether the vulcanized tread rubber has been made by winding a rubber tape a large number of turns or made by extruding rubber as a full-width strip because the boundaries between the windings appear in the cut surface.

While description has been made of one embodiment of the present invention, the embodiment should not be construed as to limit the scope of the present invention; various modifications are possible without departing from the scope of the present invention.

Comparison Tests

Heavy duty radial tires of size 12R 22.5 (rim size 8.25×22.5) shown in FIGS. 1 and 2 were made, changing the stretch of the belt layers and the footprint shapes as shown in Table 1, and tested as follows.

The stretch was adjusted by changing the inner diameter of the raw belt layer, while keeping the inner diameter of the belt layer in the vulcanized tire constant.

The footprint shape was adjusted by changing the carcass profile. The carcass profile was changed by changing the ratio between the thickness Rt1 at the bottom of the axially outermost circumferential groove to the thickness Rt2 in the sidewall upper portion as shown in FIG. 1.

Shoulder Wear, Punching and Railway Wear Test 10-ton buses provided on the front wheels with the test tires (inflated to 850 kPa) were run until the shoulder wear reached to 3.0 mm, and the total running distance was recorded. Here, the shoulder wear means the difference of the amount of wear of the shoulder blocks from that of the middle blocks. simultaneously, the running distance until punching (small dent) occurred on the middle blocks was measured. Further, the running distance until railway wear occurred on the shoulder block row or middle block row was measured. The results are shown in Table 1 by an index based on Ref.1 being 100, wherein a larger index indicates a more preferable result.

Vulcanization Finish Checkup

Each test tire was disassembled to carry out visual inspection of the finishing state of the tire including the alignment of the belt cords. The results are shown in Table 1.

TABLE 1

| Tire | Ref. 1 | Ref. 2 | Ref. 3 | Ref. 4 | Ref. 5 | Ref. 6 | Ex. 1 | Ex. 2 | Ex. 3 | Ex. 4 |
|---|---|---|---|---|---|---|---|---|---|---|
| Distance x % of TW/2 | 60 | 60 | 60 | 60 | 60 | 60 | 60 | 60 | 60 | 60 |
| Footprint shape | | | | | | | | | | |
| SL0/SL70 | 1.08 | 1.08 | 1.03 | 1.20 | 1.08 | 1.08 | 1.08 | 1.07 | 1.08 | 1.08 |
| SL70/SL97 | 1.12 | 0.93 | 1.02 | 1.02 | 1.00 | 1.00 | 1.02 | 0.98 | 1.02 | 1.05 |
| Belt layer | | | | | | | | | | |
| Max stretch (%) | 2.2 | 2.2 | 2.2 | 2.2 | 3.0 | 5.5 | 3.7 | 3.7 | 4.8 | 3.7 |
| Rt1/Rt2 | 1.00 | 0.90 | 0.94 | 1.12 | 0.95 | 0.95 | 0.97 | 0.93 | 0.97 | 0.99 |
| 8th order component of RRO of belt (mm) | 0.40 | 0.40 | 0.40 | 0.40 | 0.38 | 0.14 | 0.20 | 0.20 | 0.15 | 0.20 |
| Shoulder wear | 100 | 109 | 105 | 106 | 106 | 108 | 110 | 111 | 110 | 107 |
| Block punching | 100 | 98 | 101 | 101 | 101 | 104 | 102 | 102 | 103 | 103 |
| Railway wear | 100 | 96 | 100 | 101 | 100 | 103 | 104 | 103 | 105 | 104 |
| Finish checkup | good | good | good | good | good | no good | good | good | good | good |

The invention claimed is:

1. A heavy duty tire vulcanized in a segmented mold and comprising a tread portion defining a tread width and a footprint shape, a pair of sidewall portions, a pair of bead portions, a carcass extending between the bead portions through the tread portion and sidewall portions, and a belt layer disposed radially outside the carcass in the tread portion and composed of at least two plies of steel cords, wherein the segmented mold has a tread molding surface defined by a plural number (n) of circumferentially arranged segments, the tread portion is molded by the tread molding surface during vulcanization of the tire, wherein stretch of the belt layer in the tire radial direction during vulcanization is in a range of from 3.2 to 5.2%, the stretch S (%) is $(Ra-Rb)/Rb \times 100$, wherein Rb is the inner diameter (mm) of the belt layer embedded in a green tire of which inside is not yet pressurized, and Ra is the inner diameter (mm) of the belt layer embedded in the vulcanized tire which is mounted on a standard rim and inflated to 0.5 kPa and loaded with no tire load, both measured at the tire equatorial plane, and the tread portion is provided with an axially outermost circumferential groove at an axial distance from the tire equator which distance is in a range of from 25% to 34% of the tread width, the footprint shape satisfies the following conditions (1) and (2):

$$1.05 =< SL0/SL70 =< 1.18; \text{ and} \quad (1)$$

$$0.95 =< SL70/SL97 =< 1.05, \quad (2)$$

wherein
SL0, SL70 and SL97 are the circumferential lengths of the footprint shape measured at axial distances of 0%, 35% and 48.5%, respectively, of the tread width from the tire equator,
    whereby the belt layer has a radial run-out (RRO) whose component at n-th order is not more than 0.20 mm, wherein the number of the n-th order equals the number (n) of the segments, and the radial run-out is measured at an axial distance of 70% of one half of the tread width from the tire equator under a normally inflated unloaded condition of the tire.

2. The heavy duty tire according to claim 1, wherein
the axially outermost circumferential groove is not provided therein with a partial protrusion, whereby the cross sectional shape of the groove is substantially constant in the longitudinal direction of the groove.

3. The heavy duty tire according to claim 1, wherein
the tread portion is not provided with a sipe opened at the axially outermost circumferential groove.

4. The heavy duty tire according to claim 1, wherein
the tread rubber is composed of a plurality of windings of at least one rubber tape.

5. The heavy duty tire according to claim 1, wherein
the tread portion is provided with axial grooves intersecting said axially outermost circumferential grooves.

\* \* \* \* \*